United States Patent [19]
Curtis, Jr.

[11] 3,904,676
[45] Sept. 9, 1975

[54] PURIFICATION OF METHYL ACETATE

[75] Inventor: Burnell P. Curtis, Jr., Dickinson, Tex.

[73] Assignee: Monsanto Company, St. Louis, Mo.

[22] Filed: Apr. 26, 1973

[21] Appl. No.: 354,570

[52] U.S. Cl. ................................................. 260/499
[51] Int. Cl.² .......................................... C07C 67/48
[58] Field of Search ......................... 260/499, 488 F

[56] References Cited
FOREIGN PATENTS OR APPLICATIONS
1,194,137  11/1959  France ............................... 260/499

*Primary Examiner*—Vivian Garner
*Attorney, Agent, or Firm*—Elizabeth F. Sporar

[57] ABSTRACT

A process for the separation of methyl acetate and water by extraction of the methyl acetate with a suitable hydrocarbon solvent such as benzene, for example, separation of the resulting phases, drying of the hydrocarbon extract phase and recovery of the methyl acetate therefrom by distillation.

5 Claims, 2 Drawing Figures

3,904,676

PURIFICATION OF METHYL ACETATE

BACKGROUND OF THE INVENTION

The present invention relates to the purification of methyl acetate. More particularly, it relates to the separation of mixtures of methyl acetate and water.

Methyl acetate is generally prepared by the esterification of methyl alcohol with acetic acid in the presence of acid catalysts. The production of a pure anhydrous product is especially difficult. In the preparation of esters by the usual methods, the reaction product contains the ester, water, free acid and unreacted alcohol and the ester is separated therefrom by fractional distillation. In the case of methyl acetate, however, azeotropic mixtures are formed and the methods ordinarily used must be modified. The primary product obtained in distilling the crude ester is a binary constant boiling mixture of methanol and methyl acetate containing only 82% of the ester by weight. Methods of resolving the methanol-methyl acetate constant boiling mixture such as reaction of the methanol with a chemical like acetic anhydride, azeotropic distillation in which pentane or some other compound is a third component are known but are generally too costly for commerical production. If, alternatively, the methanol-methyl acetate azeotrope is treated with a brine solution, for example, to remove the methyl alcohol, an aqueous solution of the ester results from which a binary constant boiling mixture containing 97% ester and 3% water is obtained by distillation. The drying of this material with dehydrating agents such as anhydrous calcium chloride, sodium sulfate or their concentrated aqueous solutions as well as alumina, silica gel and the like, constitutes an undesirable and expensive operation.

To avoid the foregoing problems, techniques have been developed for conducting the esterification reaction in such a way as to eliminate the necessity for separating the methanol from the methyl acetate product. In most of these processes an excess of the acid is employed and the reaction product taken overhead consists essentially of methyl acetate and water. Depending upon the particular technique of esterification employed, the amount of water in the product will vary and there still remains the problem of separating the water and ester. While there are disclosures in the art to methods of distillation and settling for accomplishing this separation, these are not wholly satisfactory in that the resulting product is still a wet one.

The separation of methyl acetate and water is a difficult one because of the characteristics of this system. Generally, separation of such a mixture which forms two layers and a minimum boiling azeotrope can be effected by separating out the two layers and the introducing of each layer into a different distillation column to recover the components in purified form. As will be seen from FIG. 1, a temperature composition diagram for methyl acetate-water based on available literature data and some approximation therefrom, the minimum boiling azeotrope in the methyl acetate-$H_2O$ system lies outside the two-phase region. Such a separation, therefore, cannot be effected. Thus, it will be seen that there is a need in the art for a method of separating water effectively and economically from methyl acetate.

SUMMARY OF THE INVENTION

It has now been discovered that a mixture of methyl acetate in water in any proportions can be separated by subjecting the mixture to extraction with a suitable hydrocarbon solvent, separating the resulting two phases formed by decantation, subjecting the methyl acetate-hydrocarbon extract phase to distillation to remove all traces of water overhead, introducing the bottoms from said distillation into a fractionating column wherein the hydrocarbon extracting agent is separated from the methyl acetate, a pure anhydrous methyl acetate being recovered overhead from said column and the bottoms hydrocarbon extracting agent being recycled to the extraction step. More efficient recovery of methyl acetate can be effected by including a so-called methyl acetate stripper in the system to which the water phase from the separator-decanter is charged and distilled therein to recover the methyl acetate present overhead, the bulk of the water being discharged to waste. The methyl acetate containing a small amount of water recovered from the stripper is then recylced to become a part of the feed to the extraction step. Depending upon the amount of water in the mixture being purified, an additional step may be included. If the initial mixture contains 13 wt % or more of water, the main bulk of the water can be separated from the methyl acetate by a simple settling and decantation operation. Thereafter, the remaining methyl acetate-water mixture can be treated as just described. Conventional equipment is used throughout and the separation system is both effective and inexpensive.

DESCRIPTION OF THE PREFERRED EMBODIMENTS

Figure 1:
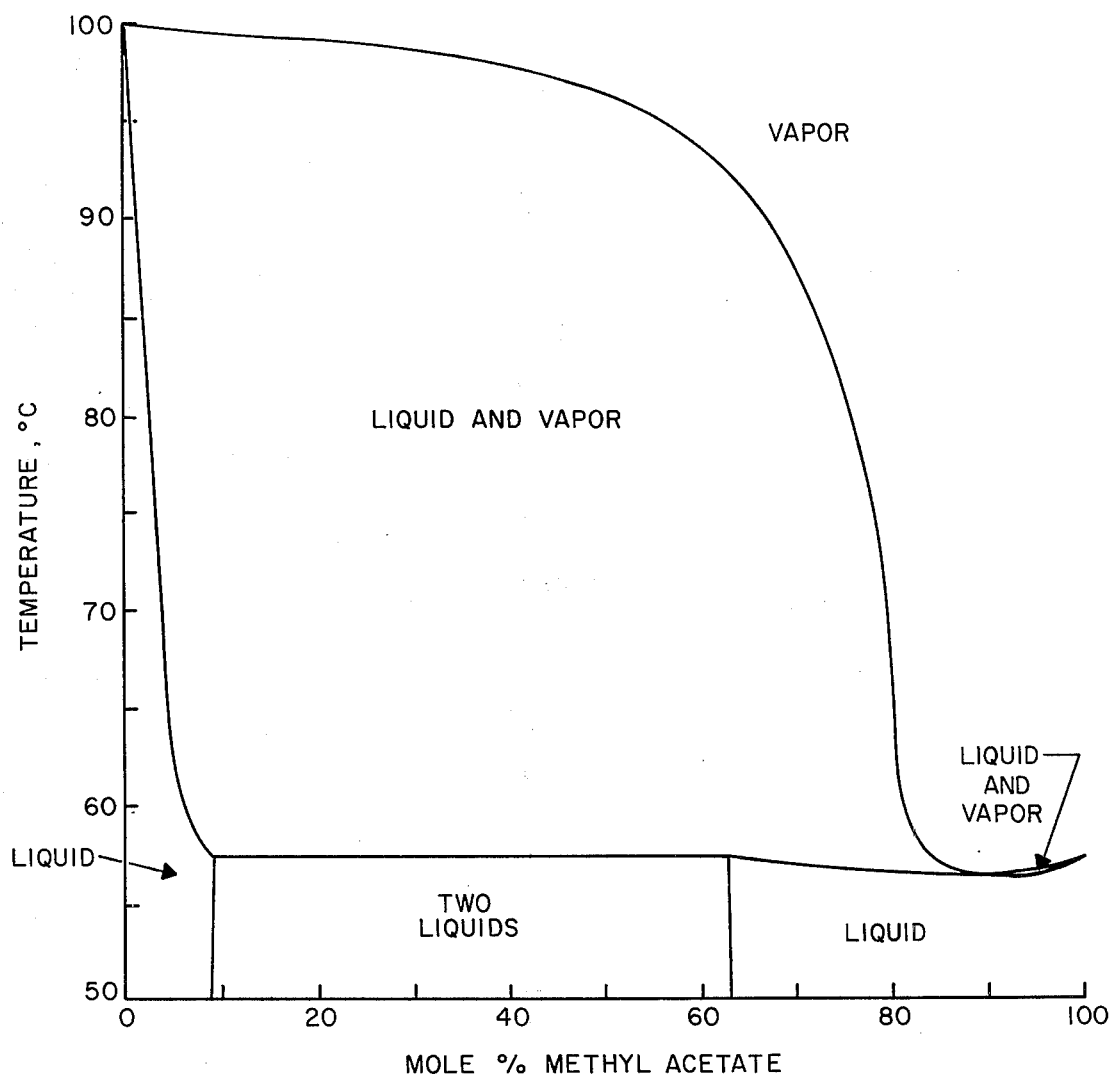
Figure 2:
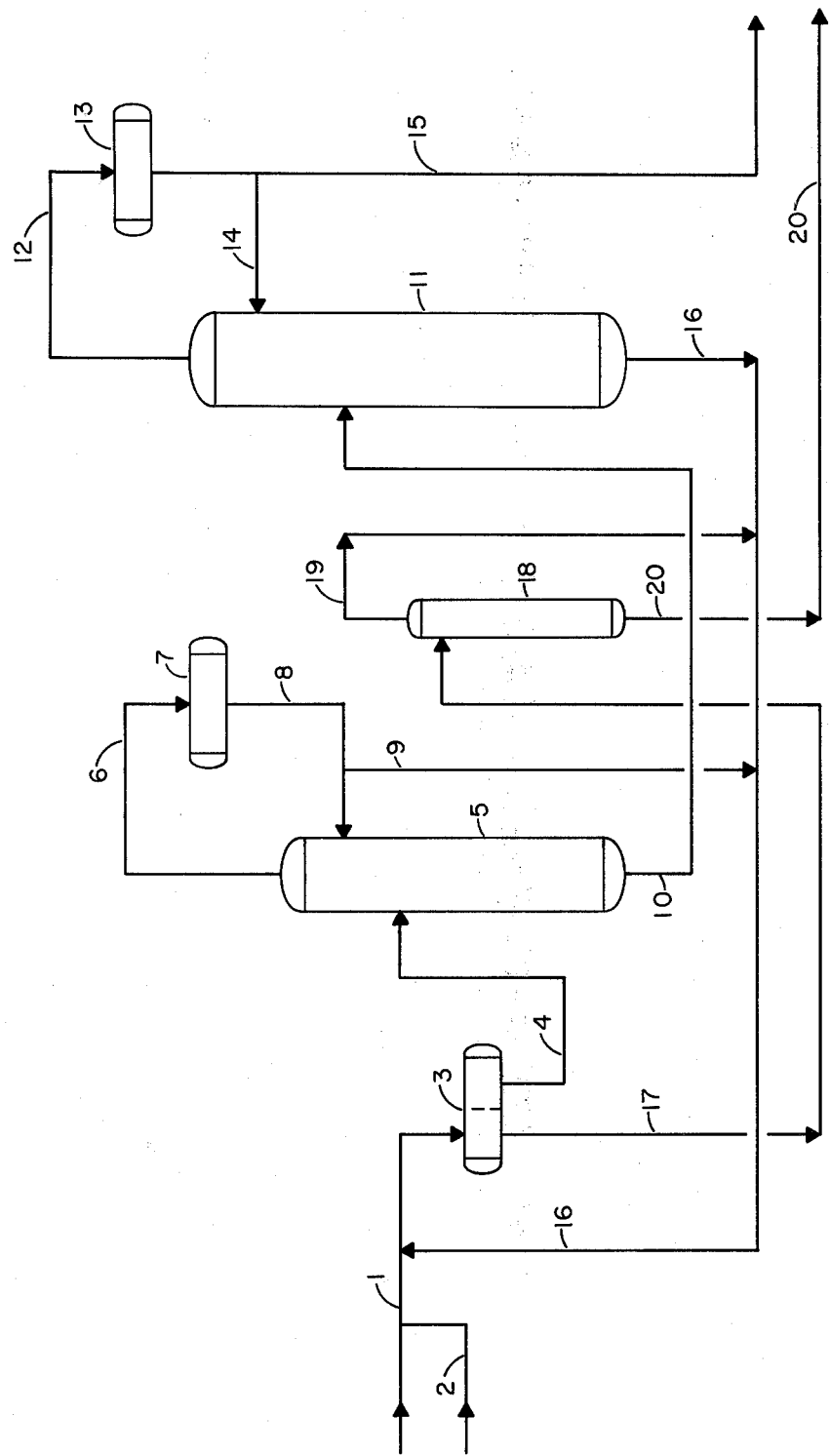

The process of the invention will be better understood by reference to FIG. 2 which is a flow diagram thereof taken in connection with the following description of a specific mode of carrying out the invention. Referring to the drawing, a mixture of methyl acetate and water is introduced into the separator 3 via line 1 together with an essentially pure hydrocarbon extracting agent charged via line 16. On start-up, the hydrocarbon extracting agent is fed through line 2 and any hydrocarbon extracting agent added to compensate for losses in the system is likewise supplied through this line. The mixture is allowed to settle to form two layers. The lighter layer, i.e., the methyl acetate-hydrocarbon extract phase, is withdrawn through line 4 and introduced into the drying column 5 at a point in the upper section of that column. Column 5 is a distillation column which serves to strip out all the water in the incoming stream. The water removed is taken overhead through line 6, condensed and sent to tank 7 and part of the condensate is passed through line 8 back to the column to serve as reflux with the remainder passing through line 9 being returned to the separator 3 for reprocessing and recovery of its methyl acetate content. The methyl acetate-hydrocarbon solution from the bottom of the drying column 5 is passed through line 10 and introduced into distillation column 11 for separation into its components. The dry methyl acetate taken overhead from column 11 through line 12 is condensed and passed through tank 13, a part of the condensate therein being fed through line 14 back to the column as reflux and the main portion passing out through line 15 to methyl acetate storage facilities. The bottoms stream from the distillation column 11 consisting essentially of the hydrocarbon extracting agent is recycled via line 16 for feeding to the separator 3.

In order to recover the methyl acetate content of the heavy layer, i.e., the water phase formed in the separator 3, this material is withdrawn through line 17 and fed into the top part of stripping column 18 in which the methyl acetate is stripped out being sent overhead through line 19 and back to the separator 3 for reprocessing. The bottoms from the stripping column 18 consisting essentially of water is sent to waste facilities via line 20.

The invention is further illustrated in the following example wherein benzene is employed as the extracting agent. All parts given are parts by weight unless otherwise indicated.

EXAMPLE

A stream containing 687.5 parts of methyl acetate and approximately 65 parts of water is introduced through line 1 into the separator 3 of FIG. 2. Also charged to the separator 3 through line 16 is a stream resulting from the combination of the bottoms from the distillation column 11, the overhead from the drying column 5 and the overhead from the methyl acetate stripping column 18 which contains 2,573.3 parts benzene, 311.1 parts methyl acetate and 9.9 parts water. The benzene-methyl acetate phase containing 995.3 parts methyl acetate, 2,574 parts benzene and 6.84 parts water is decanted and passed through line 4 into the drying column 5 where it is distilled at a temperature of about 65°C and approximately atmospheric pressure to remove the water present. The overhead stream from this column after passing through the condenser 7 and containing 253.35 parts methyl acetate, 234 parts benzene and 6.84 parts water is recycled through lines 9 and 16 to the separator 3. The bottoms from the drying column 5 is a solution of 742.2 parts of methyl acetate in 2,340 parts of benzene which is introduced into distillation column 11 to separate these two compounds by conventional fractional distillation techniques. The column is maintained at a temperature of 56°C to 80°C and atmospheric pressure. Approximately 740 parts of dry methyl acetate containing 0.78 part of benzene is recovered from the overhead of the column while the bottoms stream consisting of 2.22 parts of methyl acetate in 2,339.22 parts of benzene is recycled to the separator 3.

The heavy phase from the separator 3 consisting of about 3 parts methyl acetate, 68 parts water and 0.078 part benzene is removed via line 17 and introduced into the stripping column 18. This is a small column operated at a temperature of 100°C to 56°C and at atmospheric pressure from which a stream is taken overhead consisting of 55.56 parts of methyl acetate, 3.06 parts of water and 0.078 part of benzene and returned for reprocessing to the separator 3. The bottoms from the stripping column 18, approximately 1,800 parts of water, is sent to waste via line 20.

In addition to the benzene shown in the example as the extracting agent, other hydrocarbons can, of course, be employed. Suitable compounds for extracting the methyl acetate from the water include aromatic hydrocarbons having six to 12 carbon atoms, particularly alkyl-substituted benzenes in which the alkyl groups have one to four carbon atoms such as toluene, xylenes, ethylbenzenes, propylbenzenes, and the like; paraffinic hydrocarbons having six to 10 carbon atoms such as n-hexane, 2-methylhexane, 3-methylhexane, 3-ethylhexane, n-heptane, 2-methyl-3-ethylpentane, 3-methyl-3-ethylpentane, 2-methylheptane, 4-methylheptane, 3,3-dimethylhexane, 3,4-dimethylhexane, 2,2-dimethylpentane, 2,3-dimethylpentane, 2,4-dimethylpentane, 3,3-dimethylpentane, n-octane, n-nonane, decane, 2,2,3-trimethylbutane, 2,2,4-trimethylpentane, 2,2,3-trimethylpentane, 2,3,3-trimethylpentane, 2,3,4-trimethylpentane and the like; cycloparaffins such as cyclohexane, methylcyclohexane, methylcyclopentane, cis- and trans-decalin, 1,1-dimethylcyclohexane, cis-1,2-dimethylcyclohexane, trans-1,2-dimethylcyclohexane, trans-1,3-dimethylcyclohexane, cis-1,3-dimethylcyclohexane, cis-1,4-dimethylcyclohexane, trans-1,4-dimethylcyclohexane, ethylcyclohexane, ethylcyclopentane and the like; and olefinic hydrocarbons having six to 10 carbon atoms such as 1-hexene, 2-heptene, 2-methyl-2-heptene, 1-decene and the like. Preferred as extracting agents are the aromatic compounds and, in particular, benzene is especially preferred.

Operating conditions of temperature and pressure employed in the several separation columns will vary depending upon the particular extracting agent employed but since all the distillations are conventional, will be readily apparent to those skilled in the art.

The amount of hydrocarbon extracting agent to be employed relative to the methyl acetate will vary depending on the particular type of hydrocarbon used for extraction. This ratio is dictated to some extent as well by economic considerations since both the size of the distillation columns and the materials from which they are constructed control the capital costs of an operating unit. In general, the lower-boiling hydrocarbons will have lower molar ratios than will the higher-boiling hydrocarbons. In practical operations, the mole ratio of hydrocarbon to methyl acetate will usually be in the range from about 1:1 to about 10:1 with those in the range from about 1:1 to about 3:1 to be preferred.

While the foregoing description is of a continuous process, it will be understood by those skilled in the art that the process can be carried out as a batch operation as well.

What is claimed is:

1. A process for the separation of methyl acetate and water from a mixture of methyl acetate and water which comprises the steps of extracting the methyl acetate with a hydrocarbon solvent, separating the resulting mixture into a methyl acetate-hydrocarbon extract phase and a water phase by decantation, subjecting the methyl acetate-hydrocarbon extract phase to distillation removing as overhead all traces of water therefrom, subjecting the bottoms from said distillation to fractional distillation removing pure substantially anhydrous methyl acetate overhead and removing the hydrocarbon extracting agent as bottoms and recycling said bottoms stream to said extracting step.

2. The process of claim 1 wherein said hydrocarbon solvent is selected from the group consisting of aromatic hydrocarbons having six to 12 carbon atoms, paraffinic hydrocarbons having six to 10 carbon atoms, cycloaliphatic hydrocarbons and olefinic hydrocarbons having six to 10 carbon atoms.

3. The process of claim 1 wherein said hydrocarbon solvent is benzene.

4. The process of claim 2 wherein said water phase from said separation step is distilled to remove overhead a stream containing all the methyl acetate present while removing water as bottoms for disposal as waste, said overhead stream being recycled to said extraction step.

5. The process of claim 4 wherein said hydrocarbon solvent is benzene.

* * * * *